United States Patent
Han et al.

(10) Patent No.: US 10,938,817 B2
(45) Date of Patent: Mar. 2, 2021

(54) DATA SECURITY AND PROTECTION SYSTEM USING DISTRIBUTED LEDGERS TO STORE VALIDATED DATA IN A KNOWLEDGE GRAPH

(71) Applicant: ACCENTURE GLOBAL SOLUTIONS LIMITED, Dublin (IE)

(72) Inventors: Jingguang Han, Dublin (IE); Christophe Dominique Marie Guéret, Dublin (IE); Nicholas Patrick McCarthy, Dublin (IE); Dadong Wan, Palatine, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 156 days.

(21) Appl. No.: 15/946,528

(22) Filed: Apr. 5, 2018

(65) Prior Publication Data

US 2019/0312869 A1 Oct. 10, 2019

(51) Int. Cl.
*H04L 29/06* (2006.01)
*G06N 3/02* (2006.01)
(Continued)

(52) U.S. Cl.
CPC .......... *H04L 63/10* (2013.01); *G06F 16/9024* (2019.01); *G06F 21/64* (2013.01);
(Continued)

(58) Field of Classification Search
CPC ...... G06N 5/022; G06N 3/02; H04L 63/0428; H04L 63/10; G06F 16/901; G06F 16/9024; G06F 21/64
See application file for complete search history.

(56) References Cited

U.S. PATENT DOCUMENTS 8,332,345 B1 * 12/2012 Murphy .................. G06N 5/02
   706/50
8,442,940 B1 * 5/2013 Faletti ................. G06F 17/2785
   707/610

(Continued)

OTHER PUBLICATIONS

Piron et al; BR102017028033A2; English Espacenet Translation of BR102017028033A2_Blockchain Read Write Access_EPO Translated_English_Combined Original; hereinafter Piron (Year: 2017).*

(Continued)

*Primary Examiner* — Arvin Eskandarnia
(74) *Attorney, Agent, or Firm* — Mannava & Kang, P.C.

(57) ABSTRACT

A system for providing data security and protection using distributed ledgers to store validated data in a global knowledge graph for fraud detection is disclosed. The system may comprise a data access interface, a processor, and an output interface. The data access interface may receive data associated with an individual from a data source. The processor may convert the data into knowledge graph data by: extracting entities and relations from the data; and translating the data into knowledge graph triples to generate the knowledge graph data. The processor may validate the knowledge graph data using a cryptographic validation, to provide secured contents to update a global knowledge graph to determine a fraudulent activity level associated with the individual based on the updated global knowledge graph. The output interface may transmit a report associated with the fraudulent activity level to a report requestor at a computing device.

22 Claims, 9 Drawing Sheets

(51) Int. Cl.
*G06N 5/02* (2006.01)
*G06F 16/901* (2019.01)
*G06F 21/64* (2013.01)

(52) U.S. Cl.
CPC .............. *G06N 3/02* (2013.01); *G06N 5/022* (2013.01); *H04L 63/0428* (2013.01)

(56) References Cited

U.S. PATENT DOCUMENTS

| | | | | |
|---|---|---|---|---|
| 9,679,247 | B2* | 6/2017 | Koutra | G06N 5/022 |
| 10,089,489 | B2* | 10/2018 | Goldfarb | H04L 9/3239 |
| 10,127,511 | B1* | 11/2018 | Epstein | G06Q 10/0635 |
| 10,205,735 | B2* | 2/2019 | Apostolopoulos | G06F 16/9024 |
| 10,303,999 | B2* | 5/2019 | Hertz | G06Q 10/10 |
| 10,373,091 | B2* | 8/2019 | Epstein | G06Q 30/02 |
| 10,423,582 | B2* | 9/2019 | Stowe | G06F 16/258 |
| 2004/0015869 | A1* | 1/2004 | Herriot | G06Q 10/10 717/126 |
| 2007/0178501 | A1* | 8/2007 | Rabinowitz | G16H 70/00 435/6.16 |
| 2008/0091634 | A1* | 4/2008 | Seeman | G06N 5/022 706/59 |
| 2010/0110935 | A1* | 5/2010 | Tamassia | H04L 63/12 370/256 |
| 2012/0137367 | A1* | 5/2012 | Dupont | G06F 21/00 726/25 |
| 2013/0325787 | A1* | 12/2013 | Gerken | G06N 7/005 706/52 |
| 2016/0224637 | A1* | 8/2016 | Sukumar | G06F 16/2465 |
| 2016/0371591 | A1* | 12/2016 | Reddy | G06Q 10/06393 |
| 2018/0082305 | A1* | 3/2018 | Erenrich | G06Q 30/01 |
| 2018/0089281 | A1* | 3/2018 | Li | G06F 16/9535 |
| 2018/0107682 | A1* | 4/2018 | Wang | G06N 3/08 |
| 2018/0129958 | A1* | 5/2018 | Saxena | G06Q 20/3825 |
| 2018/0159876 | A1* | 6/2018 | Park | G06F 16/9024 |
| 2018/0165585 | A1* | 6/2018 | Saxena | G06N 5/041 |
| 2018/0165586 | A1* | 6/2018 | Saxena | G06F 21/00 |
| 2018/0165587 | A1* | 6/2018 | Saxena | G06F 19/324 |
| 2018/0165588 | A1* | 6/2018 | Saxena | G06N 5/02 |
| 2018/0165611 | A1* | 6/2018 | Saxena | G06N 5/02 |
| 2018/0173216 | A1* | 6/2018 | Spiro | G06Q 10/06 |
| 2018/0218011 | A1* | 8/2018 | Taycher | G06Q 30/0269 |
| 2018/0232659 | A1* | 8/2018 | Ranatunga | G06N 5/04 |
| 2018/0285996 | A1* | 10/2018 | Ma | G06Q 50/184 |
| 2018/0336183 | A1* | 11/2018 | Lee | G06F 17/2785 |
| 2018/0365773 | A1* | 12/2018 | Han | G06Q 50/01 |
| 2019/0036778 | A1* | 1/2019 | Bathen | H04L 43/0876 |
| 2019/0109706 | A1* | 4/2019 | Peterson | G06F 21/6245 |
| 2019/0114549 | A1* | 4/2019 | Olsher | G06N 5/04 |
| 2019/0213259 | A1* | 7/2019 | Bacarella | G06N 5/043 |
| 2019/0222567 | A1* | 7/2019 | Caldera | G06F 21/31 |
| 2019/0259033 | A1* | 8/2019 | Reddy | G06Q 20/4016 |
| 2019/0278777 | A1* | 9/2019 | Malik | G06F 16/9024 |
| 2019/0311367 | A1* | 10/2019 | Reddy | G06N 5/02 |

OTHER PUBLICATIONS

Wei Min et al., "Behavior Language Processing with Graph based Feature Generation for Fraud Detection in Online Lending", Proceedings of WSDM workshop on Misinformation and Misbehavior Mining on the Web, Jan. 1, 2018, 8 pages.

JP Buntinz, "Distributed Ledger Technology Vs Blockchain Technology", Mar. 25, 2017, 6 pages.

* cited by examiner

Example: John Doe of 123 Main Street, Ireland, was sentenced at Dublin Criminal Court yesterday after pleading guilty last week to one count of money laundering after two weeks of trial. John was found guilty of money laundering €10,000 on January 12th, 2004. The money, the proceeds of the Dublin Bank robbery, was due to be transferred abroad to Jane Smith, of 321 High Street, England.

| Entity 1 (Subject) | Relation | Entity 2 (Object) |
|---|---|---|
| John Doe | person/location/lives-in | 123 Main Street, Ireland |
| John Doe | person/person/transact | Jane Smith |
| John Doe | person/event/operate | money laundering |
| Jane Smith | person/location/lives-in | 321 High Street, England |
| John Doe | person/organisation/sentence | Dublin Criminal Court |

FIG. 4A

DATA SECURITY AND PROTECTION SYSTEM USING DISTRIBUTED LEDGERS TO STORE VALIDATED DATA IN A KNOWLEDGE GRAPH

TECHNICAL FIELD

This patent application relates generally to data security and protection, and more specifically, to systems and methods for fraud detection using distributed ledgers to store validated data in a global knowledge graph.

BACKGROUND

Cyberattacks and data breaches are becoming a more serious threat to individuals, organizations, and overall society. The number of attacks is also increasing at a rapid rate. Several conventional approaches have been used to combat data security problems. Disk encryption in hardware and software, such as on-the-fly encryption (OTFE) or transparent encryption, involves converting data to an unreadable or otherwise inaccessible format. Data masking or data obfuscation is used to "hide" data. Masking is achieved by inserting random characters in data fields to mislead and prevent sensitive data from being accessed by unauthorized personnel. Backups are used for recovery of data to help restore data in the event of data corruption or erasure. These and other techniques are used to help minimize impact of cyberattacks or data breaches.

Many of these cyberattacks or data breaches may also involve some measure of fraud, making fraud detection more important than ever. Some techniques for fraud detection may include the use of data mining or statistics. While these innovations have helped to reduce and mitigate risk, an accurate and reliable way to identify or predict fraudulent activity remains a challenge. Collaboration among various individuals and organizations may help increase the information pool to better detect and prevent fraud, such as money laundering or terrorism financing.

However, with increased globalization, data is being shared at a rapid rate and in large quantities, both of which are making it difficult to monitor exchange of such data and potential warning signs of fraud. Another technical problem associated with conventional techniques for fraud detection is that there is a lack of standardized prototype or universally-accepted format for sharing transaction data. Furthermore, the multi-lingual nature of data now adds another layer of complexity for data security in international transactions.

Because government and law enforcement agencies, banks and financial institutions, corporate and organizational entities, as well as individuals generally rely on some form data security and protection, a more robust approach for fraud detection may be needed in order to more securely share information, accurately identify potential fraudulent activity, and reliably reduce risks associated with data transactions.

BRIEF DESCRIPTION OF DRAWINGS

Features of the present disclosure are illustrated by way of example and not limited in the following Figure(s), in which like numerals indicate like elements, in which:

FIG. 4A illustrates entity and relation extraction in a security and protection system for detecting fraud, according to an example;

DETAILED DESCRIPTION

Figure 1:
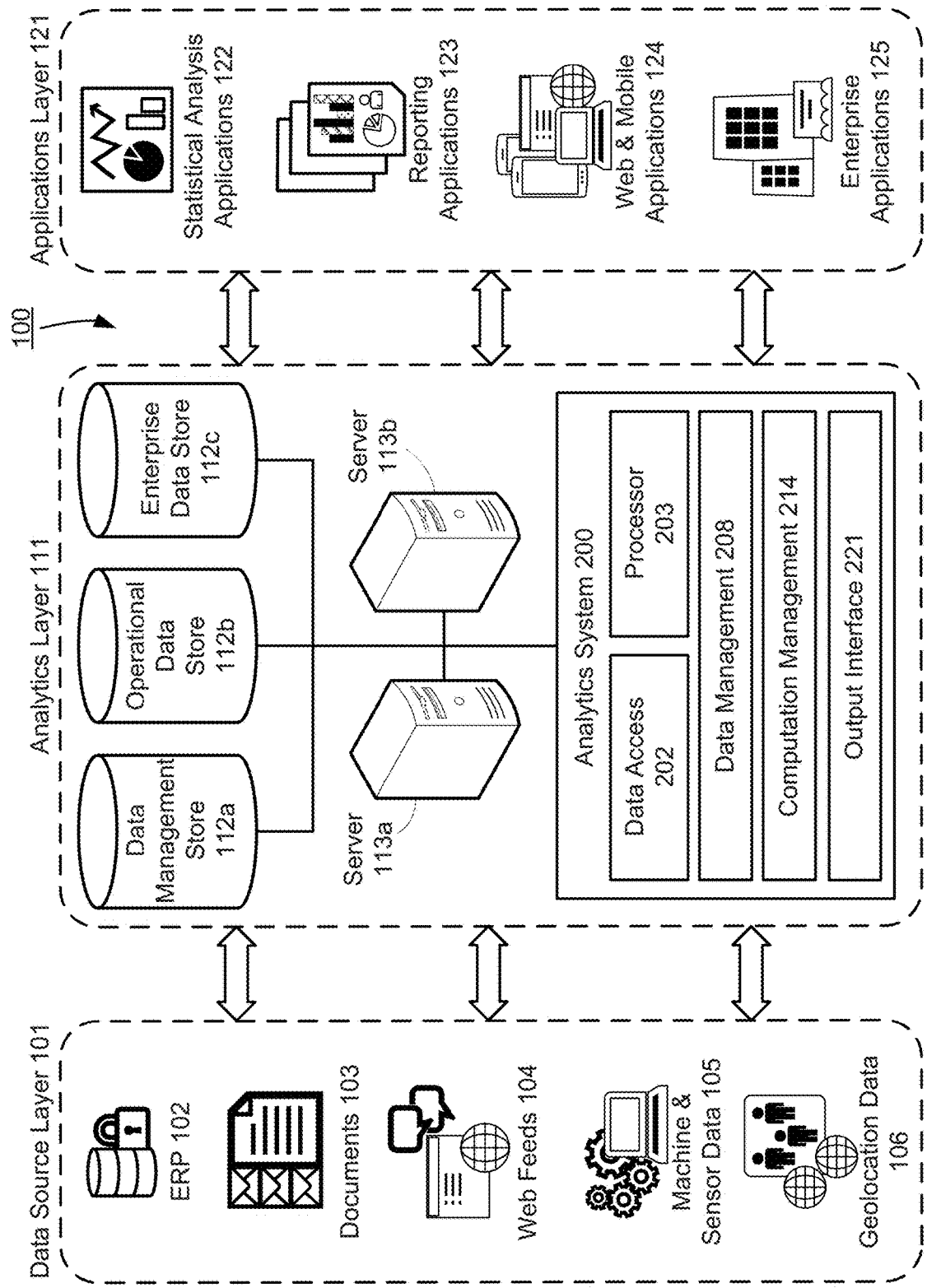
FIG. 1 illustrates a data security and protection system using distributed ledgers to store validated data in a global knowledge graph for fraud detection, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, a more robust approach for fraud detection may be needed to securely share information, accurately identify potential fraudulent activity, and reliably reduce risks associated with data transactions. Many organizations, such as financial institutions, may rely heavily on sharing transaction data. However, such entities are finding it difficult to provide adequate techniques or solutions to anticipate and prevent fraudulent money-laundering or terrorism-financing schemes.

Fraud detection technologies may be used in many industries, such as banking and financial institutions, government and law enforcement agencies, insurance companies, corporate or organization entities, and more. Fraud attempts have seen a drastic increase in recent years, making fraud detection more important than ever. Despite efforts on the part of affected parties and pertinent governing bodies, hundreds of millions of dollars may be lost to fraud every year.

The effects of fraud may be quite serious. In the insurance industry, for example, approximately 25% of claims may contain some form of fraud, resulting in nearly 10% of insurance payout dollars. Fraud may also range from exaggerated losses to deliberately causing an accident in order to receive a payout. In banking, fraud may involve using stolen credit cards, forging checks, misleading accounting practices, etc. It may also involve altering shared transaction data. With all the various methods of fraud, identifying and predicting future fraudulent activity may be harder still. The reason for this may be found in the rather complicated nature in identifying and predicting instances of fraud.

An important step in early fraud detection may include identifying factors that lead to fraud. Techniques involving data mining and statistics may help anticipate and detect fraud to some degree. These techniques may also initiate one or more anti-fraud or remediation actions. Use of sophisticated data mining tools, such as decision trees, machine learning, association rules, cluster analysis, neural networks, or other predictive models, may help reduce some risk associated with fraud. For example, they may help identify probability of fraudulent behavior or a dollar amount of fraud loss.

Fraud detection techniques may also include other techniques, such as predictive modeling, anomaly detection, text mining, etc. For example, techniques involving classification may provide assignment of instances to pre-defined classes to decide whether there are matches or correlations. In another example, clustering may be used to identify groupings of related data points without labels.

Knowledge graphs may also be used to provide and facilitate collaboration of shared data for fraud detection. Compared to other knowledge-oriented information systems, a knowledge graph based system may offer a special combination of knowledge representation structures, information management processes, and search algorithms. A knowledge graph may provide an organized graph that ties nodes and edges. A node may be related to semantic concepts, such as persons, objects, entities, events, etc. An edge may be defined by relations between nodes based on semantics. It should be appreciated that as used herein, the term "node" may be used interchangeably with "entity," and "edge" with "relation."

Data acquired for knowledge graph generation or contribution may involve open semantic databases, more reputable sources of web content, open crawl databases, or other similar sources. Naturally, this may be based on the semantic nature of a knowledge graph. In other words, meaning of data may be encoded alongside data in a graph, usually in an ontological form. Because a knowledge graph is self-descriptive, it may be important to use higher quality sources to make the necessary relationships. By providing an analytics-driven technique based on knowledge graphs, the details and nuances of many "connections" or "relationships" may be provided in a visual or explanatory fashion.

Linking data in this way may allow a knowledge graph based information system to form an ecosystem that provides a lot of helpful information that would otherwise not be obtained. A knowledge graph based information system of this kind may comprise three main components: construction, storage, and consumption. Knowledge graph technologies may then be classified into one of these categories of such an ecosystem where their contribution is most relevant. In construction and storage categories, for example, (i) knowledge graph technologies may include knowledge representation and reasoning (KR) (languages, schema and standard vocabularies), (ii) knowledge storage (e.g., graph databases and repositories), (iii) knowledge engineering (e.g., methodologies, editors, and design patterns), and (iv) knowledge learning including schema learning and population, all of which may be automatic or near-automatic. The first three (i)-(iii) categories may be more related to KR, databases, ontologies, and semantic web. For the fourth (iv) category, technologies related to data mining, NLP, and machine learning may be employed. From a consumption perspective, it should be appreciated that a knowledge graph's content may be directly accessed and analyzed via query languages, search engines, custom interfaces, and/or generation of (domain/application-specific) graph summaries and visual analytics.

Ultimately, a knowledge graph based information system may have a flexible structure and offer many advantages over other forms of analytics. For example, because a knowledge graph is semantic, queries may be submitted in a style much closer to natural language. It, therefore, enables a smarter search, makes for more efficient discovery, and narrows any communication gaps between data providers and consumers. Since the underlying basis of a knowledge graph is the ontology, which specifies the semantics of data, a knowledge graph may be based on logical formalisms, which may support a variety of inferences or educated guesses. Because knowledge graphs are graphs by nature and provide a visual representation, this may also allow various graph-computing techniques and algorithms to add additional intelligence over stored data. Lastly, a knowledge graph may be easily updatable and may change with newly-infused data. Data growth is important, especially when dealing with heterogeneous sources.

A knowledge graph may therefore support a continuously running pipeline of information, adding to the graph, refining the graph, all as new information continues to arrive. And by capturing diverse meta-data annotations, such as provenance or versioning information, this may make knowledge graphs ideal for dynamic data sets useful in fraud detection. It should also be appreciated that a knowledge graph may enhance effectiveness of traditional information processing systems (e.g., information extraction, search, recommendation, question answering, etc.) by providing valuable background domain knowledge.

As a result, many enterprises may benefit from the power of information systems built on knowledge graphs. A knowledge graph based information system may allow ease of access to computer systems by end users. It may also empower user communities to represent, manage, and share knowledge in highly collaborative ways. Lastly, it may enable increased machine interoperability. Accordingly, industries associated with banking, energy, or telecommunications, which may handle information created by thousands of users, may find a knowledge graph based information system quite helpful especially as in a global environment where decisions are becoming more and more data-driven.

Referring back to fraud detection, a knowledge graph may be used to allow a network of individuals, insurance companies, banks and financial institutions, or other entities to share data, identify relationships, and stimulate communication and identification of potential fraud. For instance, one way this may be achieved is by creating a "global" knowledge graph that may be managed in "chunks" or smaller pieces. A global knowledge graph may be authored decentrally by a plurality of users or contributors, and even in smaller portions, while still maintaining an overall coherence of the knowledge graph.

One potential challenge, however, with a decentralized knowledge graph having of many authors or contributors may be controlling access and insertion of validated data. As one can imagine, risk of manipulation of shared data may be enhanced in an environment that does not have any standardized prototype or universally-accepted format for sharing transaction data. Furthermore, the multi-lingual nature of data now adds another layer of complexity for data security in international transactions. In order to combat this technical problem, the systems and methods described herein for fraud detection may use distributed ledgers (e.g., blockchain technologies) to store (and validate) in a secure and decentralized way, the contents of a global or shared knowledge graph.

Blockchain or distributed ledger systems have been proposed for a variety of application scenarios, including applications in the financial industry, healthcare, emerging markets, and so forth. An early example of a blockchain involved a cryptocurrency generated when new blocks were created on the blockchain to confirm events. These new blocks may confirm transfer of cryptocurrency generated in earlier blocks. The blocks on the blockchain were cryptographically proofed and linked to earlier blocks and served as an immutable record of the events in a trustless decentralized peer-to-peer network. For example, a cryptocurrency (e.g., bitcoin) may be represented as a chain of events that transfers ownership from one party to another party on a blockchain without an intermediary. Each event transferring ownership from one party to another may then be cryptographically proofed by including the public key of the new owner. Also, each event may be digitally signed with the current owner's private key.

A new block in a blockchain may be filled with cryptographically proofed events until the block reaches a specified size limit. A hash digest of all event identifiers within the block and the block header of a previous block may be added as the first event in the block. Each block of events may be secured by a race between participants on a peer-to-peer network. In order to win the race, participants may collect new events to create the new block, validate events on the new block by verifying the cryptographic proofs of each event to verify the cryptocurrency was not spent earlier, and finally solve a mathematical puzzle based on the hash digest, previous block header, and a random number. Blockchain may provide a mathematical hierarchy of verifiable events that is immutable and is verified at each stage by the race between the participants.

Many blockchain implementations have emerged since its application in cryptocurrency. There are currently over eighty different kinds of blockchains or distributed ledger technologies. The system and methods described herein may apply distributed ledgers together with global knowledge graphs in data security and protection for fraud detection. In this way, different parties, entities, and users may have write access to a knowledge graph and may contribute to the distributed ledger, as well as grant read access to other parties, without worry of manipulating the shared data. It should be appreciated that the techniques described herein may provide a data security and protection system for fraud detection using distributed ledgers to store validated data in a global knowledge graph.

As described in detail herein, splitting a knowledge graph into subsections, and thereby authoring it decentrally while preserving its coherence, may rely on agreements. Different parties may need to have a common-agreed upon schema extended to suit the parties' needs. The systems and methods described herein may leverage expressivity of semantic web ontologies as standardized by W3C (World Wide Web Consortium or WWWC) to let different contributors subclass a core ontology into more specific meanings. These specialized ontologies may then be made available to everyone in a network and used to express data, ultimately assisting entities make more accurate and reliable identification of potential fraud.

FIG. 1 illustrates a data security and protection system using distributed ledgers to store validated data in a global knowledge graph for fraud detection, according to an example. The data security and protection system 100 may be used to monitor and analyze data. In particular, the data security and protection system 100 may capture data from a data source layer 101 or from other sources and provide predictive analytics using distributed ledgers to store validated data in a global knowledge graph for fraud detection at an analytics system 200.

The data security and protection system 100 may operate in a network or an enterprise IoT environment (e.g., financial institution) where data is exchanged. The data security and protection system 100 may include a data source layer 101, an analytics layer 111, and an applications layer 121. The data source layer 101 may include systems, subsystems, applications, and/or interfaces to collect information from a variety of sources. These may include, but not limited to, enterprise resource planning (ERP) systems and applications 102 (hereinafter "ERP"), documents 103, web feeds 104, machine and sensor data 105 (hereinafter "sensor data"), and geolocation data 106, all of which may be distinct or integrated with the data security and protection system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other parties. The ERP 102 may contain a large amount of information that could be used to enhance meaning of other data sources.

The documents 103 may provide another source of data. Data received at the documents 103 may include files, emails, faxes, scans, or other documents that are transmitted, received, and stored in an enterprise environment. This may also include owner's manuals for products or systems or other documentation or communicated information.

The web feeds 104 may be yet another source of data. Data received at the web feeds 104 may include data from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photo-sharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information. In an IoT environment, many systems and products may be equipped with numerous sensors or diagnostic equipment that may provide a plethora of machine and sensor data 105. There may be a number of physical devices, vehicles, appliances, systems, or products that are equipped with electronics, software, and sensors, where most, if not all, of these items may be connected to a network and share some measure of connectivity with each other. This may enable these and other pieces of equipment to communicate and exchange data. This may also allow various systems, objects, and items to be detected, sensed, or remotely controlled over one or more networks, creating a vast array of asset management functionalities. These may include abilities to provide data analytics on equipment, assessment of equipment health or performance, improved efficiency, increased accuracy or function, economic benefit, reduction of human error, etc. Together with other technologies and systems, the machine and sensor data 105 may help enable the data security and protection system 100 provide predictive analytics using distributed ledgers to store validated data in a global knowledge graph for fraud detection.

Geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, Internet Service Provider (ISP), language, proxies, or other information that can be used to piece together and trace location. This and other data in the data source layer 101 may be collected, monitored, and analyzed to provide predictive analytics using distributed ledgers to store validated data in a global knowledge graph for fraud detection.

It should also be appreciated that the data security and protection system 100 may also provide a gateway (not shown) as an intermediary between the data source layer 101 and the analytics layer 111. In an example, the gateway may provide edge computing for the machine and sensor data 105. The gateway may sit at an "edge" of the data source layer 101 or local network, and function as an intermediary before transmitting data to the analytics layer 111. The gateway may perform and run analytics in order to decrease time, expense in data delivery, and perhaps even taking immediate action at equipment to which the sensors are attached. In many ways, the gateway may provide real-time or near real-time analytics at the edge to simplify the analytics process and increase responsiveness and efficiency.

The gateway may be physical or virtual element and may be configured for compact or full implementation. When devices and sensors send data to the gateway, this data may be initially parsed and, depending on the rules and actions that are configured, some critical and time-saving analytics may be immediately performed right at the gateway itself. This may save time, energy, and costs associated with full transmission of data to the analytics layer 111. It should be appreciated that the gateway may operate in partial or full capacity, or it may be removed entirely. It should also be appreciated that data analytics and processing techniques described below with respect to the analytics layer 111 may also be performed partially or in full by the gateway.

The analytics layer 111 may collect, manage, process, and analyze information and data from the data source layer 101 and the applications layer 121. The analytics layer 111 may be within general control of an enterprise, such as an organizational entity conducting operations, business, or other related activities. This may be an organization that operates one or more factories, fleets of vehicles, chains of stores or restaurants, etc. In another example, as described herein, this organization entity may also be a financial institution that collaborates with other entities to use distributed ledgers to store validated data in a global knowledge graph for fraud detection. In order to conduct business operations, the analytics layer 111 of the data security and protection system 100 may include one or more data stores, one or more servers, and other elements to process data for its organizational purposes.

For example, the analytics layer 111 may include data stores, e.g., a data management store 112a, an operational data store 112b, and an enterprise data store 112c. In an example, the data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112b may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an additional data stores in the data security and protection system 100.

The enterprise data store 112c may be used for tactical and strategic decision support. For example, the enterprise data store 112c may store information and data associated with reporting and data analysis, and may be instrumental to various business intelligence functions. The enterprise data store 112c may be one or more repositories of integrated data (e.g., from the operational data store 112b) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the analytics layer 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the data security and protection system 100 and/or run one or more application that utilize data from the data security and protection system 100. Other various server components or configurations may also be provided.

The analytics layer 111 may further include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide integrated monitoring and communications may also be provided.

The analytics layer 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided.

There may be several examples of hardware that may be used for the servers, layers, subsystems, and components of the analytics system 200 or the data security and protection system 100. For example, the processor 203 and/or computation management subsystem 214 may comprise an integrated circuit, and may execute software or firmware or comprise custom processing circuits, such as an application-specific integrated circuit (ASIC) or field-programmable gate array (FPGA). The data access interface 202 and output interface 222 may be any number of hardware, network, or software interfaces that serves to facilitate communication and exchange of data between any number of or combination of equipment, protocol layers, or applications. For example, the data access interface 202 and output interface 222 may each include a network interface to communicate with other servers, devices, components or network elements via a network in the data security and protection system 100. More detail of the analytics system 200 is provided in FIG. 2.

The data security and protection system 100 may also include an applications layer 121. The applications layer 121 may include any number or combination of systems and applications that interface with users or user-interfacing tools in an enterprise or IoT environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the analytics layer 111. Again, the application layer 121 may also provide a source of valuable information for the analytics system 200.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the gateway, servers, and/or other elements within the systems, layers, and subsystems of the data security and protection system 100. However, it should be appreciated that multiple servers may be used for each of these servers, and the servers may be connected via one or more networks. Also, middleware (not shown) may be included in the data security and protection system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the back-end to facilitate the features and functionalities of the data security and protection system 100.

Within the data security and protection system 100, there may be a large amount of data that is exchanged, and the exchanged data may contain data related to performance, health, and activity of many products and systems in or outside of enterprise control. In some examples, financial institutions may communicate with other financial institutions, regulating bodies, users, members, or other data contributors or viewers. Many of the conventional techniques to use or process the data, as described above, are limited. They do not adequately or reliably provide solutions to complex questions. Referring back to the example of the problems associated with fraud detection, a more robust approach for fraud detection may be needed. The data security and protection system 100, described herein, may solve this technical problem by using distributed ledgers to store validated data in a global knowledge graph for fraud detection.

Figure 2:
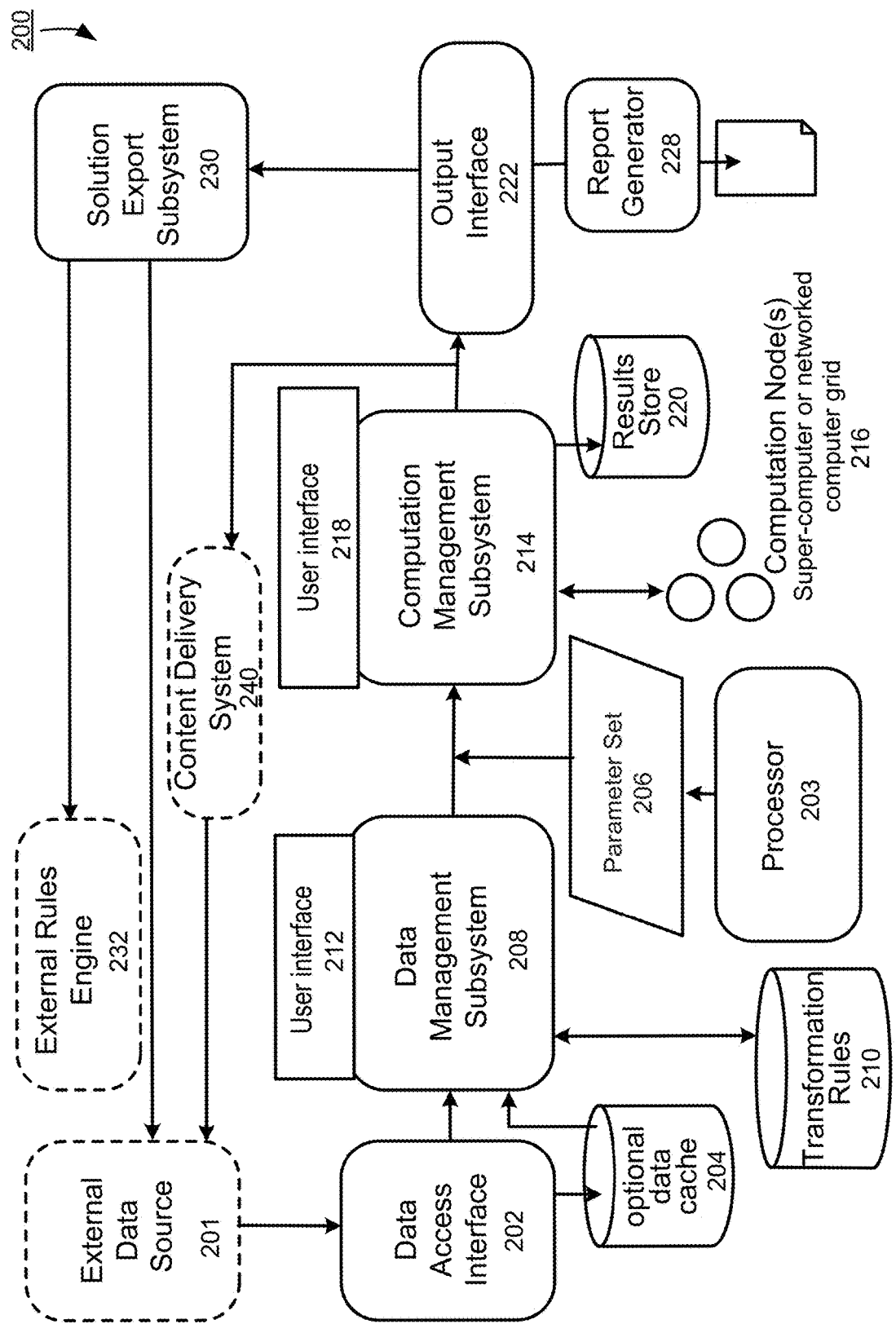
FIG. 2 shows an analytics system for data security and protection in fraud detection, according to an example.

FIG. 2 shows an analytics system for data security and protection in fraud detection, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide data security and protection in fraud detection. In an example, the analytics system 200 may be an integrated system as part of the analytics layer 111 shown in FIG. 1.

In the example of FIG. 2, data may be accessed from an external data source 201 by a data access interface 202. The external data source 201 may be any data source from the data source layer 101, analytics layer 111, and applications layer 121 of the data security and protection system 100 of FIG. 1, as well as other data sources not depicted. The data access interface 202 may optionally store some or all (or none) of the data in an optional data cache 204, which may be local or remote. It should be appreciated that data acquired for knowledge graph generation may involve open semantic databases, more reputable sources of web content, open crawl databases, or other similar source. This may be based on the semantic nature of a knowledge graph. In other words, meaning of data may be encoded alongside data in a graph, usually in an ontological form. Because a knowledge graph is self-descriptive, it may be important to use higher quality sources to make the necessary relationships, as described in more detail below.

The imported data may then be passed to a data management subsystem 208 for processing prior to performing analytics. For example, data collected at the data source layer 101 may be in various formats. Thus, the data management subsystem 208 may organize the data by grouping, ordering, transforming, or cleaning the data in such a way that facilitates input of the data into analytics processing. It should be appreciated that the data management subsystem 208 may perform these features alone or in conjunction with other components of the analytics layer 111, such as the servers 113a and 113b. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

The variables determined by the data management subsystem 208 and a parameter set 206 generated by the processor 203 may be provided to the computation management subsystem 214. The computation management subsystem 214 may send the processed data including the parameter set 206 and one or more chosen algorithms to one or more computational nodes 216 to perform computational operations. The computation management subsystem 214 may generate knowledge graphs, perform clustering operations, execute classification, and/or perform other analytics or machine-learning actions. The computation management subsystem 214 may also validate data using blockchain or distributed ledgers.

As described above, classification may provide assignment of instances to pre-defined classes to decide whether there are matches or correlations. Clustering may use groupings of related data points without labels. While various data mining and predictive analytics may be performed at the computation management subsystem 214, a knowledge graph may provide an organized graph that ties nodes and edges pertinent to examples described herein.

Once imported data is transformed by the data management subsystem 208 and variables determined, the computation management subsystem 214 may apply a heuristic approach, such as a text parsing or processing based on regular expressions, including natural language processing (NLP) techniques. For audio, machine translation may be used to convert audio to natural language text. For images or videos, metadata may be used for basic heuristic processing. In another example, the computation management subsystem 214 may apply deep learning techniques that may pull in various classification, clustering, and/or metrics-based approaches, as well as knowledge graph generation or data validation using blockchain or distributed ledgers. These approaches may be self-driven or may be supervised. In some examples, supervised learning algorithms may utilize target driver variables specified by the user to facilitate searching for particular solutions, among the potentially many solutions generated by the computation nodes 216, that are meaningful to the user. The computation management subsystem 214 may also provide a user interface 218 that shows the user the progress of knowledge graph generation or validation of stored data using blockchain or distributed ledger technologies.

An output interface 222 may also be provided. The output interface 222 may output the generated knowledge graph. Accordingly, the output interface 222 may also include a visualization interface that may present knowledge graphs and other information pertaining to the knowledge graph. A report generator 228 may generate report regarding the knowledge graphs.

In some implementations, the visualization interface may also provide a variety of evaluation results, for example, to a solution export subsystem 230. The solution export subsystem 230 may provide feedback information to the analytics system 200 or other systems in the data security and protection system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a knowledge graph to different types of external databases and external systems. In some implementations, the solution export subsystem 230 may be configured to export one or more rules or algorithms for semantic data, based on the knowledge graph that was generated or blockchain or distributed ledger application. The rules or algorithms may enable external systems to apply those rules or algorithms to implement the generated knowledge graphs to various types of data stored on internal or external databases. In some implementations, the system may obtain data from the external system, retune the knowledge graph based on the received data (such as changing variable selection or other changes or newly validated data), and send information regarding a revised knowledge graph to the external system. As such, in some implementations, the analytics system 200 may enable more than just an analytics tool, but also enable a feedback-based and connected enterprise system.

It should be appreciated that once the output interface 222 provides the knowledge graph and results of the evaluation, the report generator 228 may generate a report to be output to a user, such as a security manager or other user. The report may include various types of information, such as the knowledge graph itself, an evaluation of the knowledge graph or other calculations, and may enable a user to adjust one or more variables of the analytics system 200 to fine-tune operations, as described herein.

By providing an analytics technique using distributed ledgers to store validated data in a global knowledge graph, the analytics system 200 may enable the user to analyze the details and nuances of many (e.g., dozens of) solutions at the same time in an explanatory fashion and more reliably predict instances of potential fraud. A knowledge graph based analytics system may allow a user to explore a large number nodes and semantic relationships efficiently in less time than it would take a typical practitioner to evaluate. In this way, the analytics system 200 may incorporate a whole host of media and information, in a heterogeneous manner, that results in a more efficient and more intuitive way of monitoring and managing assets and equipment. By using blockchain or distributed ledgers to validate stored transaction data, an entity such as a financial institution worried about fraud may more accurately rely on a global or decentralized knowledge graph to identify things like culprits associated with money-laundering or terrorism financing.

It should be appreciated that using distributed ledgers to store validated data in a global knowledge graph for fraud detection may have a flexible structure and offer many advantages over other forms of analytics. For example, knowledge graphs are semantic, where meaning of data may be encoded alongside data in a graph, or form of an ontology. In other words, a knowledge graph is self-descriptive and provides a single place to find data and understand what that data is all about. Moreover, because a knowledge graph is semantic, queries may be submitted in a style much closer to natural language. It, therefore, enables a smarter search, makes for more efficient discovery, and narrows any communication gaps between data providers and consumers. Furthermore, since the underlying basis of a knowledge graph is the ontology, which specifies the semantics of data, a knowledge graph may be based on logical formalisms, which may support a variety of inferences or educated guesses. Because knowledge graphs are graphs by nature and provide a visual representation, this may also allow various graph-computing techniques and algorithms to add additional intelligence over stored data. Lastly, a knowledge graph may be easily updatable and may change with newly-infused data. Data growth is important, especially when dealing with heterogeneous sources. Using distributed ledgers to store validated data may provide a more secure way to view/analyze a global knowledge graph for fraud detection purposes. Such a knowledge graph may therefore support a continuously running pipeline of reliable information, adding to the graph in a secure fashion, refining the graph by authenticated users or contributors, all as new information continues to arrive. And by capturing diverse meta-data annotations, such as provenance or versioning information, this may make knowledge graphs ideal for dynamic data sets for fraud detection.

Accordingly, the analytics system 200 may provide a more robust approach for fraud detection that securely shares validated information, accurately identify potential fraudulent activity, and reliably reduce risks and future data breaches associated data transactions.

In order to provide fraud detection in accordance with the data security and protection system 100 described herein, it may be important to institute agreements when splitting up a knowledge graph into subsections to provide decentralized authoring of the knowledge graph, especially where different parties may need to have a common-agreed upon schema extended to suit various parties' needs. The systems and methods described herein may leverage expressivity of semantic web ontologies as standardized by W3C (World Wide Web Consortium or WWWC) to let different contributors sub-class a core ontology into more specific meanings. These specialized ontologies may then be made available to everyone in a network and be used to express data, ultimately assisting entities make more accurate and reliable identification of potential fraud.

Figure 3:
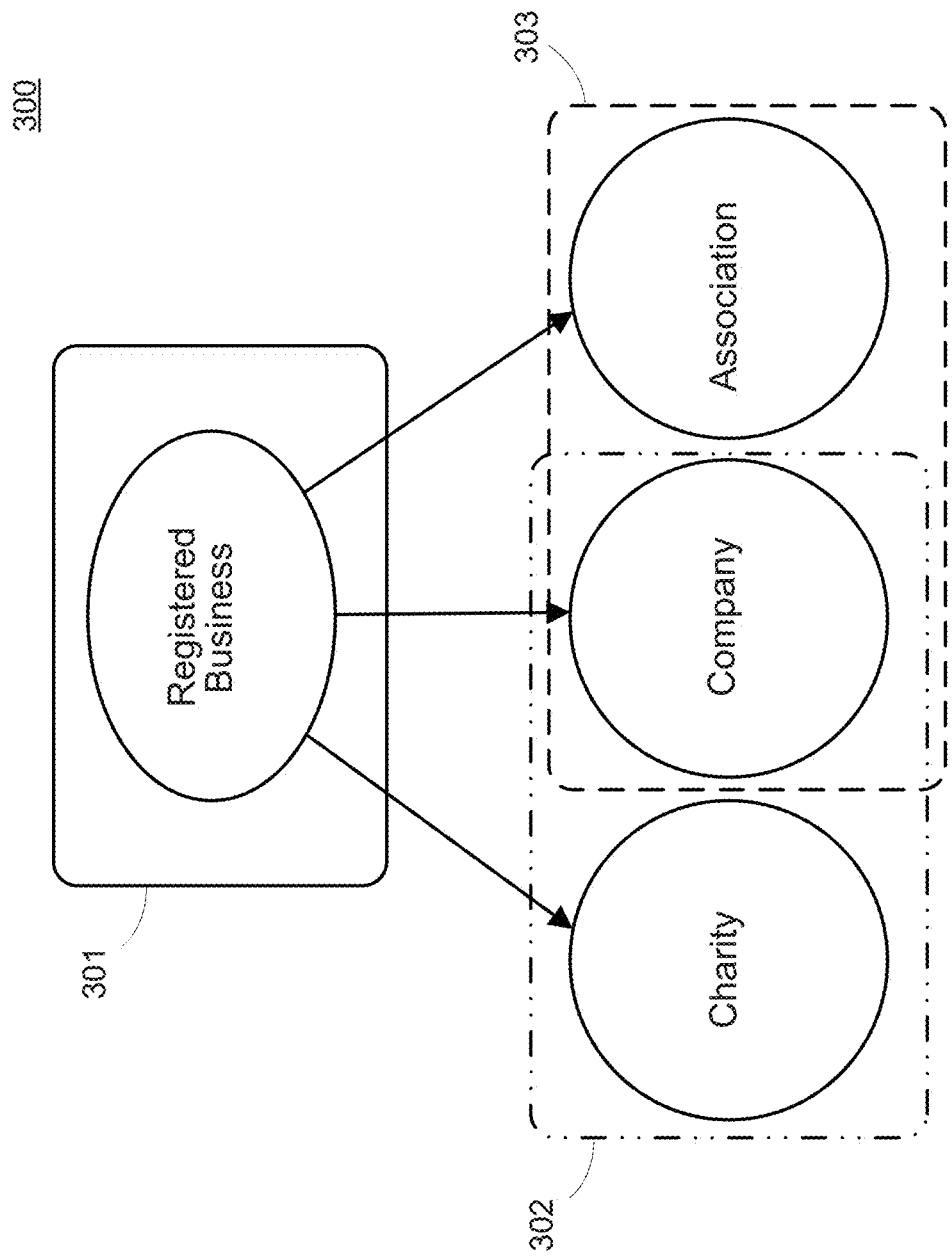
FIG. 3 illustrates an ontology hierarchy in a security and protection system for detecting fraud, according to an example.

FIG. 3 illustrates an ontology hierarchy 300 in a security and protection system for detecting fraud, according to an example. In an example, a core ontology 301 may reflect a global level of agreement for parties involved. It may be established that such level of agreement is only made on very general terms. In order to fully express a semantic of their data, it should be appreciated that participants may be able to further refine the core ontology by sub-classing its content.

For example, as shown in FIG. 3, the core ontology 301 may define a general concept of a "Registered Business," which may be a bank or other similar entity. The Registered Business may be further specified into two disjoint types: "Company" and "Charity" 302, whereas another bank may define it another way, as "Company" and "Association" 303. These two specialized ontologies 302 and 303 may add additional layers to how data is viewed in a shared context. For instance, these four entities may at some point form four or more registered legal entities, each of which may transfer money in and out. As a result, the two specialized ontologies may be able to reliably speak about "Company." Such an ontological hierarchy 300 may be extrapolated and enlarged to provide nuanced and comprehensive knowledge graph generation and representation.

FIG. 4A illustrates entity and relation extraction 400A in a security and protection system for detecting fraud, according to an example. As shown, an entity and relation extraction 400A may be performed by an entity, such as a bank or financial institution. This entity and relation extraction may begin with a piece of text, as shown in FIG. 4A, and reproduced below, regarding an individual by the name of John Doe:

> John Doe of 123 Main Street, Ireland, was sentenced at Dublin Criminal Court yesterday after pleading guilty last week to one count of money laundering after two weeks of trial. John was found guilty of money laundering €10,000 on Jan. 12, 2004. The money, the proceeds of the Dublin Bank robbery, was due to be transferred abroad to Jane Smith, of 321 High Street, England.

In this example, the analytics system 200 may receive information regarding John Doe in a text format, e.g., using plain and natural language. In another example, this input may be provided by a user or it may be acquired from public or private sources. It should be appreciated that the data may be in a text format, but other formats may be acceptable as well, such as audio, visual, multimedia, or other format. As described above, the analytics system 200 may either convert the input into text, use metadata associated with the input, or combination both or other techniques in order to process the data. In an example, natural language processing (NLP) techniques may be used. Other semantic-based techniques or input processing processes, such as those found in clustering or classification may also be provided.

In order to transform the data, entity and relation extraction 400A may be performed by the analytics system 200. As shown in FIG. 4A, the analytics system 200 may parse this text data and identify entities and relations, resulting in the following identification:

Relations={person, location, live, date, time, money laundering, robbery, activity, ... };
Entities={John Doe, 123 Main Street, Ireland, Dublin Criminal Court, yesterday, €10,000, Jan. 12, 2018, Jane Smith, 321 High Street, England, ... }.

Once the entities and relations are identified from the input, the analytics system 200 may make many probabilistic connections, one of which may be a connection 401 between John Doe and Jane Smith, as shown in FIG. 4A. In this example, it may be shown that there was a transaction between the two individuals, potentially making Jane Smith a suspect in fraud or other criminal activity and some worth monitoring. The analytics system 200 may also perform other knowledge graph based features, such as a query expansion, entity linking, relation inferences, etc.

Figure 4B:
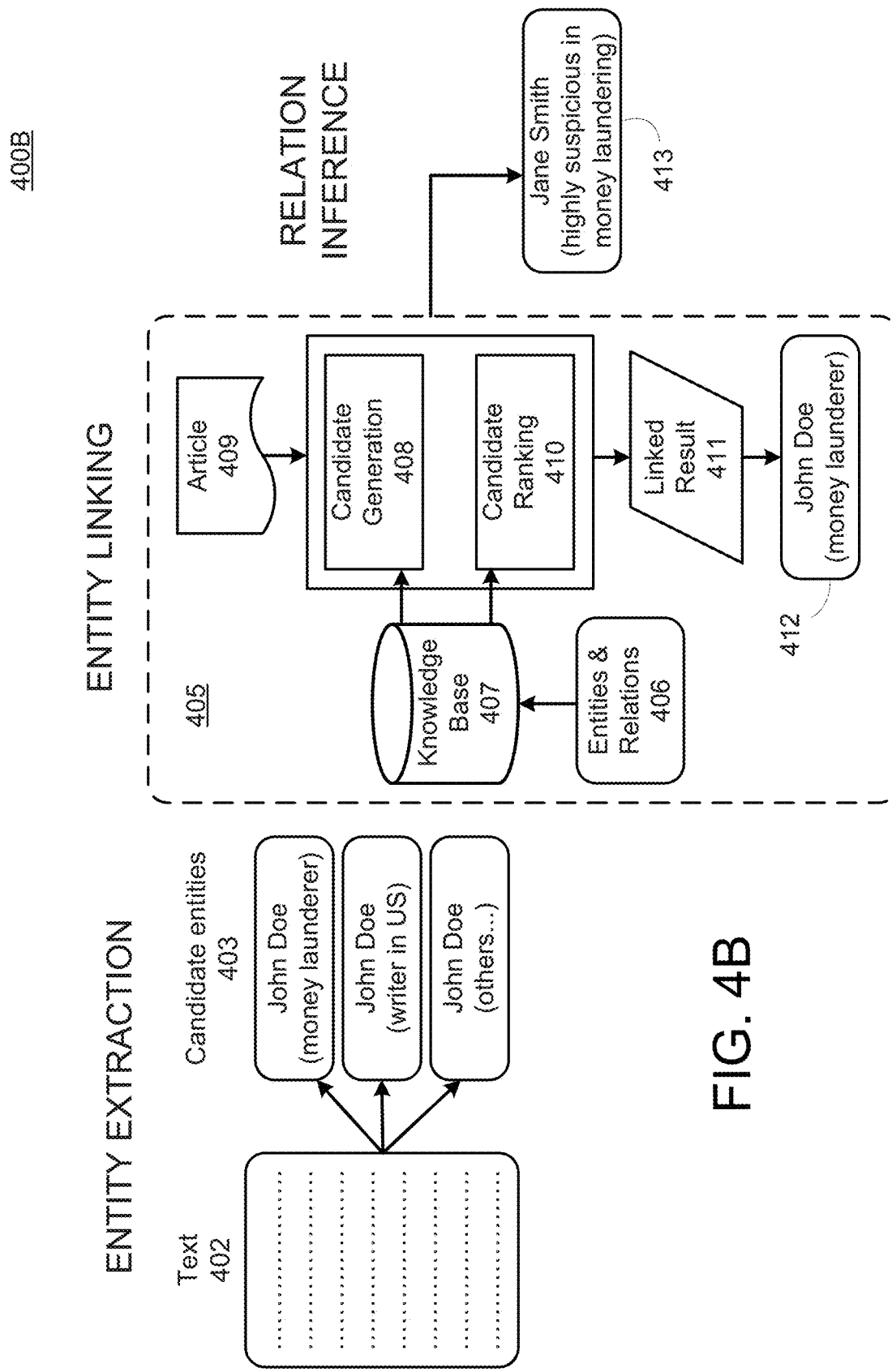
FIG. 4B illustrates entity linking and inference in a security and protection system for detecting fraud, according to an example.

FIG. 4B illustrates entity linking and inference 400B in a security and protection system for detecting fraud, according to an example. As shown in FIG. 4B, the query expansion may take information from the nodes and edges, in this case the entities and relations, as well as information from any related and existing knowledge graph, and expand the original input to include additional relevant entities and relations from the knowledge graph into usable text 402. Using entity and relation expansion, as well as additional text transformations, entities and relations may be used to plot a metric space graph or other usable metric.

It should be appreciated that in mathematics, a metric space is a set for which distances between all members of the set are defined. Those distances, taken together, are called a metric on the set. A metric on a space induces topological properties like open and closed sets, which lead to more abstract topological spaces. While Euclidean (linear) metric space is most common, a variety of metric spaces may be employed, such as geometric (elliptic or hyperbolic), or other forms (e.g., hyperboloid, velocity-based, etc.). By plotting a metric space graph, the strength of connections between the nodes and edges, for example, may be more precisely determined. Other techniques may also be provided.

Once the expansion occurs, the data originally derived from the data may be translated to usable text 402, such as knowledge graph (KG) data or KG query language. The expansion may also help to identify candidate entities 403. In an example, identified candidate entities 403 may include: "John Doe (money launderer)," "John Doe (a writer in the United States)," and "John Doe (other various details . . . )." In order to find relevant candidate entities 403, entity linking may be performed by an entity linking system 405.

As shown, the entity linking system 405 may involve taking entities and relations information 406 acquired from an extraction phase, e.g., usable text 402, and inserting them into a knowledge base 407, which may be a data store. The knowledge base 407 may then transfer this information an entity linking subsystem comprised of a candidate generation platform 408 and a candidate ranking platform 410. The candidate generation platform 408 may also receive information or data from an article 409, which may be other documents or data sources, similar to those described above. The candidate ranking platform 410 may take one or more linked results 411 and conclude statistically, based on data acquired, that John Doe is a money launderer. This may be expressed as "John Doe (money launderer)" 412, as shown. Based on one or more relation inferences, it may further be determined that Jane Smiths is a high suspicious individual. This may be expressed as Jane Smith (highly suspicious in money laundering) 413. It should be appreciated that link analysis may be achieved via clustering or other similar ways to form such connections and relations.

Figure 5:
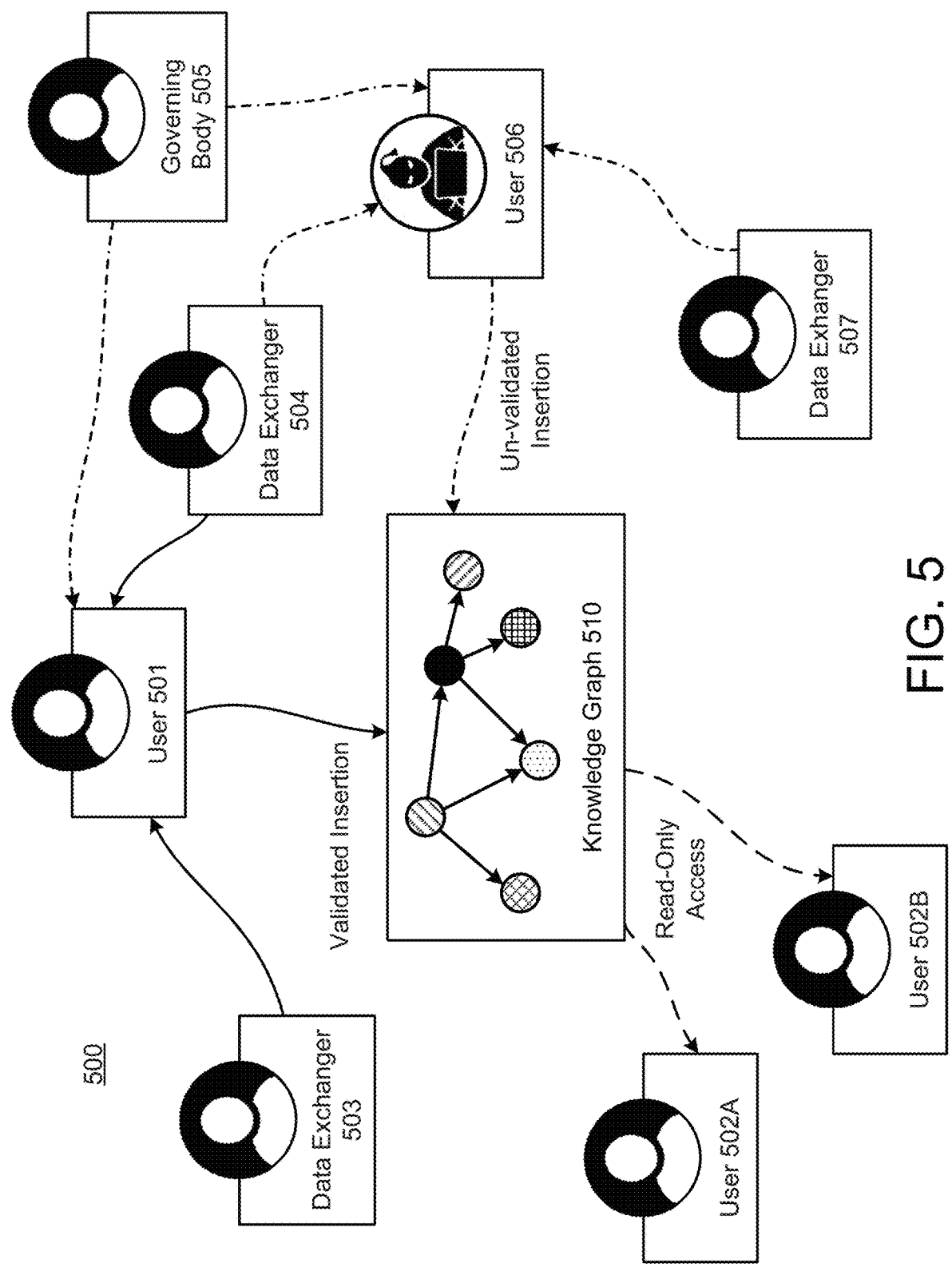
FIG. 5 illustrates permissioned access to a knowledge graph in a security and protection system for detecting fraud, according to an example.

FIG. 5 illustrates permissioned access to a knowledge graph 500 in a security and protection system for detecting fraud, according to an example. It should be appreciated that various actions, such as writing, reading, and/or validation of blockchain entries, of a global knowledge graph may be limited to those with cryptographic access. In this way, it may allow a regulatory body, for example, to oversee using one or more validation mechanisms. It may also facilitate an open banking scenario by increasing transparency and data visibility. Both blockchain (or distributed ledger) and knowledge graphs may then be distributed and decentralized, where not all nodes (e.g., banks, etc) are required to insert or store data to complete blockchain. Banks, governing bodies, regulators, or other participating entities may participate in block validation.

As shown in FIG. 5, a user 501 may provide a validated insertion of data into the shared knowledge graph 510. The user may also receive data from a data exchanger 503, which may include a financial institution, regulator, or other entity who is not directly contributing to the knowledge graph 510. The user 501 may have read and write access to the knowledge graph 510. However, there may be some users 502A and 502B who have read access only. As such, users 502A and 502B may not be able to store or insert any data to the knowledge graph 510. There may be other entities provided as well. These may include data exchanger 504 and governing body 505. In this example, data exchanger 504 may be another financial institution, regulator, or other entity who does not contribute directly to the knowledge graph 510. The data exchanger 504, however, may share information with validated user 501. Governing body 505 may regulate user 501 and information that is stored in the knowledge graph 510. However, data exchanger 504 may also share information with user 506, who may be involved in one or more fraudulent activities. The user may attempt to insert un-validated information to the knowledge graph 510. The governing body 505 may also regulate activities of the user 506. User 506 may also receive information from other valid or invalid sources, such as data exchanger 504 and 507. Ultimately, by providing a permissioned access at various levels, with regulation by peer entities or governing bodies, knowledge graph contribution may be limited to those with cryptographic access and fraudulent activities by certain users may be more easily regulated.

Figure 6A:
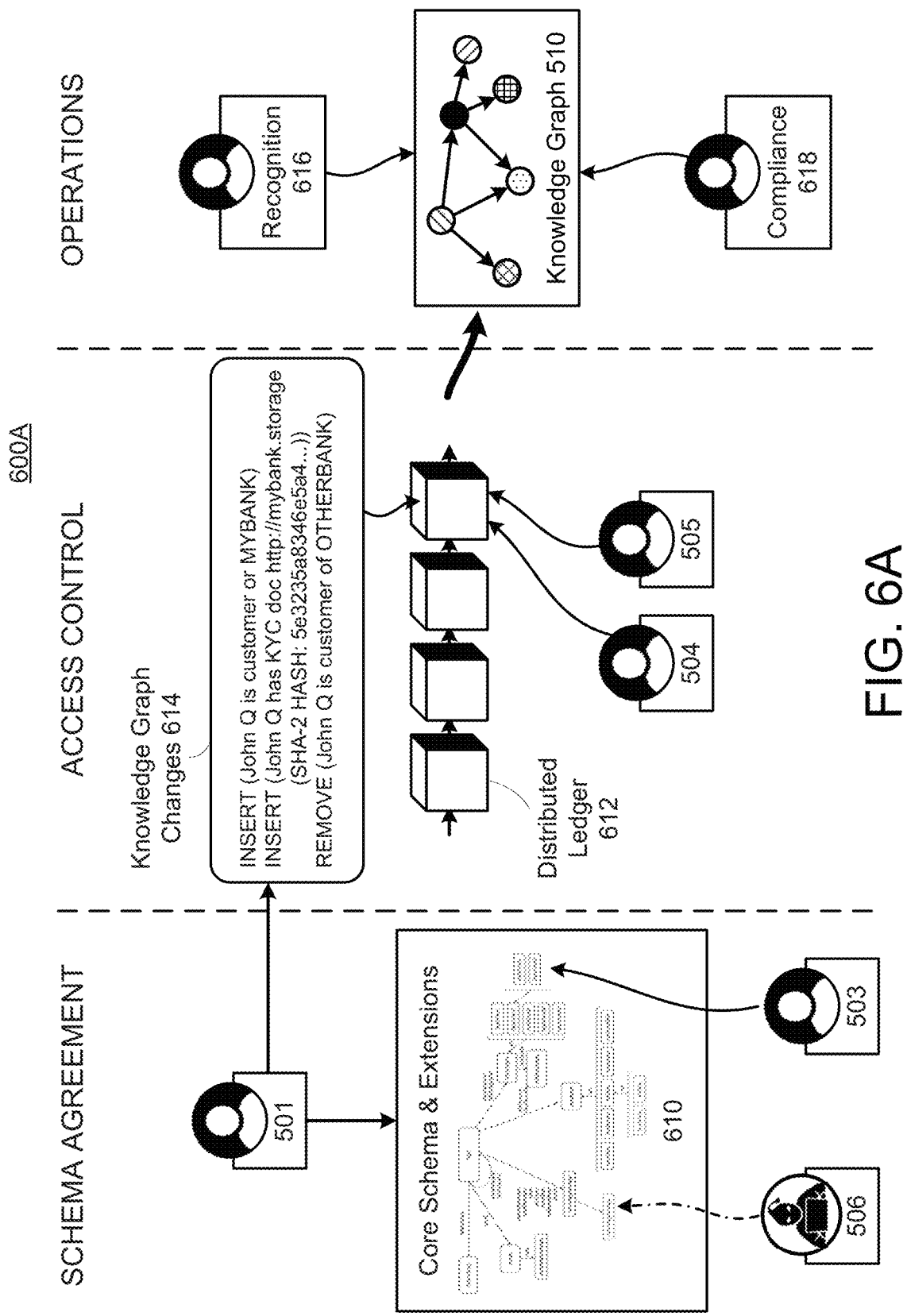
FIG. 6A illustrates a data flow in a security and protection system for detecting fraud, according to an example.

In order for permissioned access to provide adequate security and protection against data manipulation, blockchain or distributed ledger technologies, or other cryptographic validation, may be provisioned at various levels throughout the fraud detection process. FIG. 6A illustrates a data flow 600A in a security and protection system for detecting fraud, according to an example. In this example, there may be a schema agreement section, an access control section, and an operations section. While most of the knowledge graph updates, edits, and changes are performed within the control access section, it should be appreciated that data security and protection begins with a core schema and extensions 610.

Figure 6B:
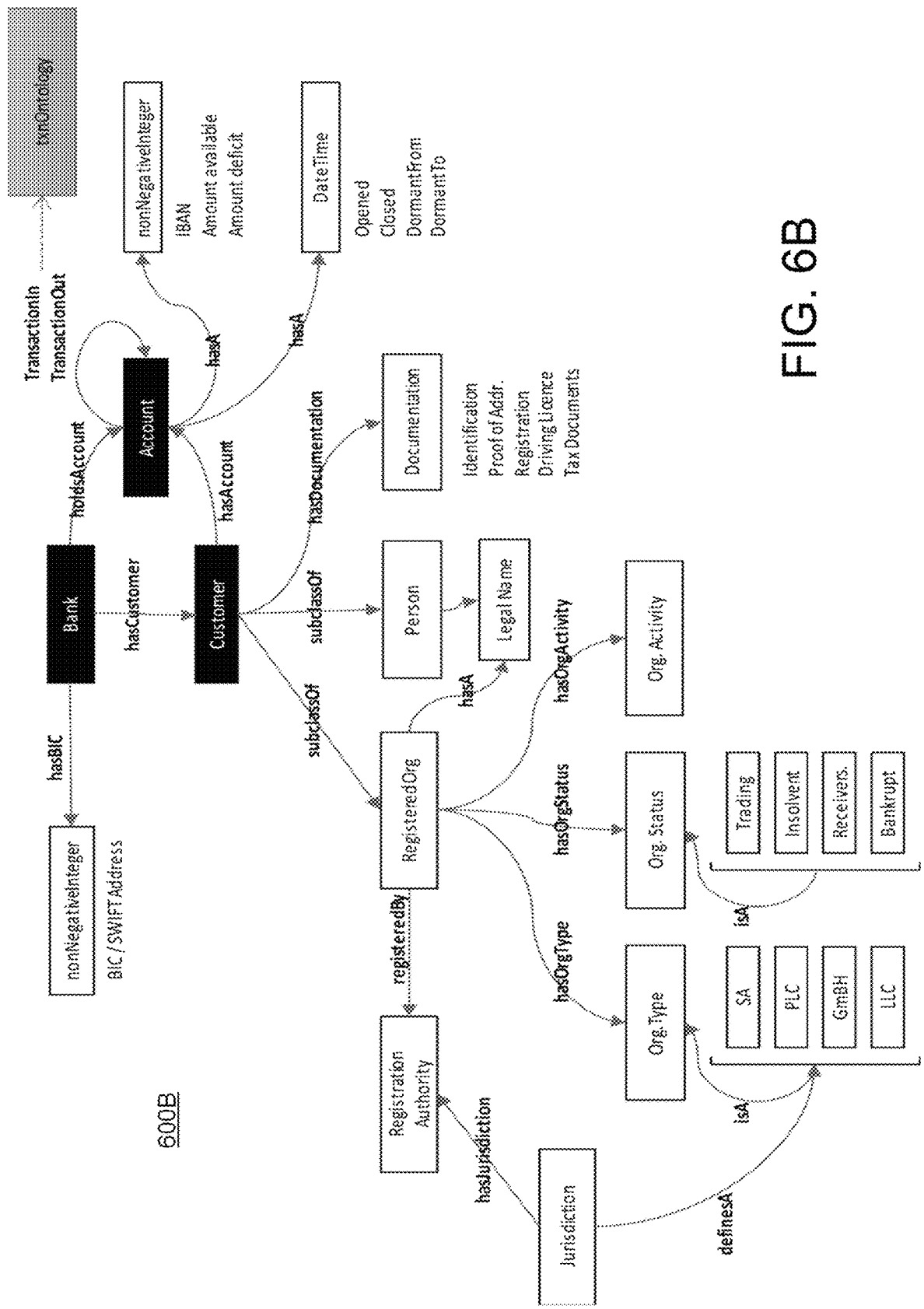
FIG. 6B illustrates a core schema and extensions in a security and protection system for detecting fraud, according to an example.

As shown in FIG. 6A, a user 501 may be a validated user 501 may contribute to the core schema and extensions 610, which may be described in more detail in FIG. 6B. It should be appreciated that internal data structures may be mapped to a core schema. In an example involving a financial institution, such as a bank, bank-specific extensions may be permitted or added to the core schema. As shown, user 503 may provide bank-specific extensions to the core schema, whereas user 506, who may be a suspicious entity, may also at this point add extensions as well. These additions, without further control may lead to undetected fraudulent activity. Once the core schema and extensions are made, data may then be submitted to a blockchain or distributed ledger in a form knowledge graph (KG) triples using the core schema.

It should be appreciated that a KG triple may be based on semantic triples, as used in an atomic data entity in a Resource Description Framework (RDF) data model. More specifically, a KG triple may be a set of three entities that codifies a statement about semantic data in the forms of subject-predicate-object expressions. This format may enable knowledge to be represented in a machine-readable way. In this case, a KG triple may allow a knowledge graph generator or editor to receive and process the data received and generate the knowledge graph consistent with that data or update the knowledge graph.

For example, FIG. 6B illustrates a core schema and extensions 600B in a security and protection system for data integration, according to an example. The core schema 600B depicts how an ontology may be arranged to define initial data types and relationships included in a knowledge graph. The core schema 600B may also allow for extensions, so that if, for example, an institution required or associated a customer with a documentation type that is not generally included in the core schema, that institution may extend the core schema by sub-typing a new documentation type underneath the 'Documentation' entity. In this case, an institution may introduce a <'Visa', 'isN', 'Documentation'> schema extension, which would signal that any new 'Visa' data points are a type of 'Documentation,' and by extension is associated with a particular customer through the 'hasDocumentation' relationship.

It should be appreciated that in addition to data integration in the financial industry, this core schema framework may also be used to track provenance in manufacturing supply chains. To achieve this, entities in a supply chain may come to an agreement to share data in a common knowledge graph. The terms of this knowledge graph may be defined in advance and may comprise a core vocabulary. Extensions to this schema may then be introduced as required by subscribing entities, and would likely converge towards the W3C recommended PROV ontology, as shown in FIG. 6B.

Data at various points of the supply chain may be inserted into a knowledge graph and may be used to track provenance for items in the supply chain. In this manner, items may be tracked from source (e.g., manufacturing facility or farm), through packaging, logistics, store-delivery, in-store tracking, and/or customer point-of-sale.

An advantage this provides to consumers is that there may be a verifiable provenance chain that allows a user or entity to trace an items path back to an original source. Participating entities may benefit from increased data interoperability that facilitates integration and collaboration along the supply chain. Other various implementations and variations may also be provided.

Referring back to FIG. 6A, once the KG triples submitted for knowledge graph changes 614, it may be added or stored to a blockchain or distributed ledger 612 for validation. In an example, the user 501 may submit the following for insertion:

INSERT (John Q is customer or MYBANK)
INSERT (John Q has KYC doc http://mybank.storage (SHA-2 HASH: 5e3235a8346e5a4 . . . ))
REMOVE (John Q is customer of OTHERBANK)

In this example, the distributed ledger 612 may contain a complete transparent, accountable record of insertions and deletions into knowledge graph 510. It should be appreciated that documents may be linked to outside the distributed ledger 612, but a digital signature may be stored on the distributed ledger 612 to ensure data immutability. For instance, natural language processing (NLP) functions may be performed on validated, digitally signed documents. In addition, it may be feasible to also include file-level access controls. The distributed ledger 612, in this case, may be validated by one or more users, such as user 504 and 505, which may be one or more financial institutions, entities, regulators, or governing bodies. All this may help facilitate an online transaction, for example, using a decentralized distributed digital ledger for recording transactions across many computing devices, users, and entities without data alterations.

At the operations section, the knowledge graph 510, which may be a global knowledge graph with decentralized authors, may be provided. Since data in the knowledge graph 510 has been submitted using a common core schema and verified by network of entities (e.g., banks, regulators, etc.), the knowledge graph 510 may be relied upon for fraud detection analysis. It should be appreciated that distributed ledgers and knowledge graphs are based on distributed systems technologies, where a complete distributed ledger may include an entire knowledge graph. However, it should be noted that nodes in a distributed ledger may not require to hold a complete copy, and once validated, a knowledge graph may also be geographically distributed for access, usage, or updating. Again, NLP functions, including named-entity-recognition, may be performed on validated and digitally signed unstructured text documents. This may facilitate anti-money laundering pattern recognition actions by a recognition entity 616. It may also simplify one or more compliance actions by a compliance entity 618.

Figure 7:
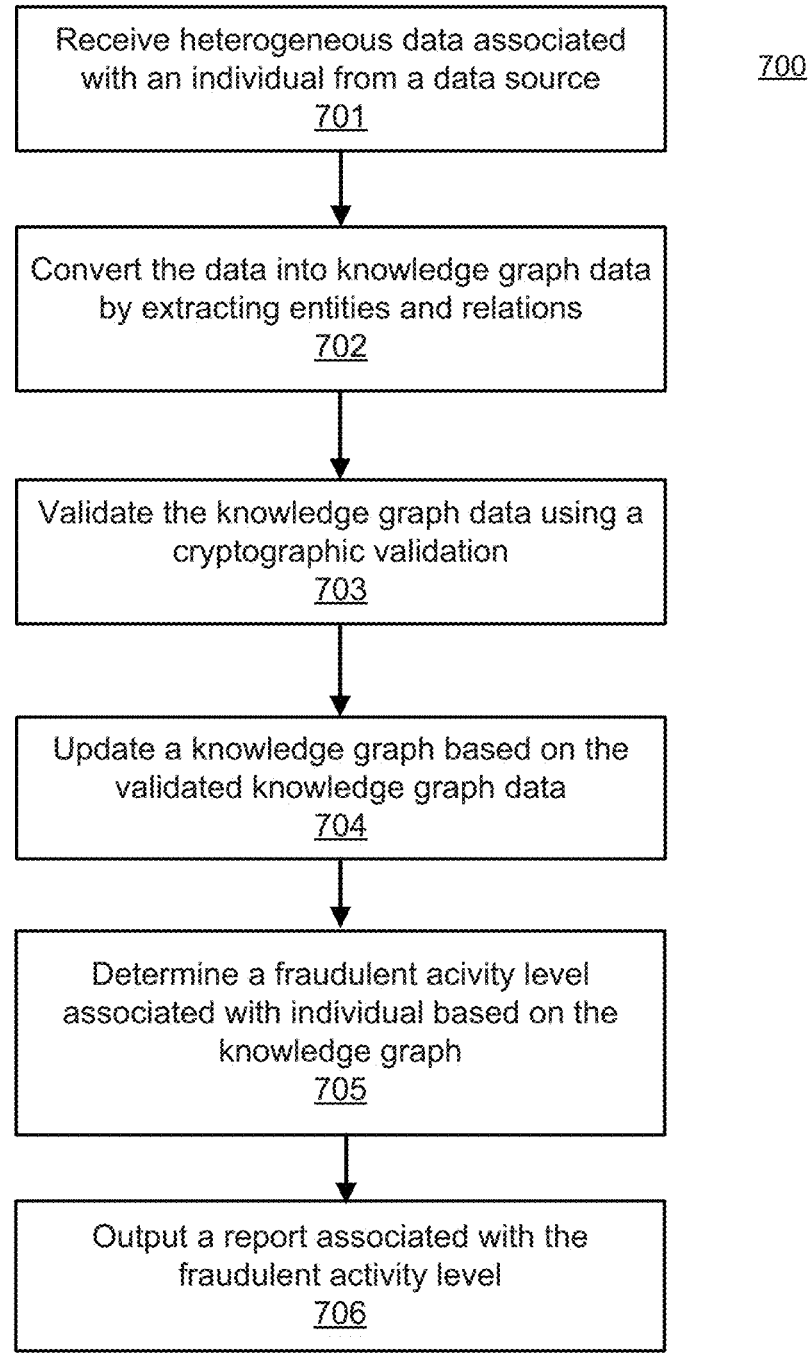
FIG. 7 illustrates a method for data security and protection using distributed ledgers to store validated data in a global knowledge graph for fraud detection, according to an example.

FIG. 7 illustrates a method for security and protection in a fraud detection system, according to an example. The method 700 is provided by way of example, as there may be a variety of ways to carry out the method described herein. Although the method 700 is primarily described as being performed by system 100 as shown in FIG. 1 or system 200 as shown in FIGS. 1-2, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At block 701, the data access interface 202 of the analytics system 200 may receive data associated with an individual from a data source. In an example, the data may be heterogeneous data from a plurality of entities (e.g., a financial institution, association, etc.), and the individual may be associated with at least one of the plurality of entities. The data may be unstructured data and comprise private information, public information, or a combination thereof. The private information may include financial information, account information, personal information or other types of private information. The data may also be in a text format, an image format, an audio format, or a combination thereof. In some examples, in the event the data is received in a non-text format, the data may be converted to a text format.

It should also be appreciated that the data source may include an enterprise resource planning (ERP) system, a document, a web feed, a sensor, a geolocation data source, an enterprise database, a public database, a server, an analytics tool, a mobile device, a reporting system, a user input, and/or other data source, public or private.

At block 702, the processor 203 may convert the data into a knowledge graph data. In an example, the processor 203 may perform an entity extraction on the data to identify one or more entities. The processor 203 may also perform a relation extraction on the data to identify one or more relations between the one or more entities. Once the entities and relations are extracted from the data, the processor 203 may translate the data into knowledge graph triples based on the one or more entities and the one or more relations. The result may be generation of knowledge graph data to be used to update to a knowledge graph 510. It should be appreciated that converting the data into knowledge graph data may involve at least some natural language processing (NLP). It should also be appreciated that the entity extraction and/or the relation extraction may be performed using a recurrent neural network. In some examples, the knowledge graph 510 may be a global knowledge graph. As described above, a global knowledge graph may be authored decentrally by a plurality of contributors. It should also be appreciated that the update to the knowledge graph may include an addition, a subtraction, a modification, or a combination thereof to the one or more entities or one or more relations.

At block 703, the processor 203 may validate the knowledge graph data by using a cryptographic validation on the knowledge graph data. This may provide data security and protection for contents of the knowledge graph 510. In an example, the cryptographic validation may include storing a digital signature on a distributed ledger to provide immutability of the knowledge graph data to be used to update the knowledge graph 510. The cryptographic validation may also include a variety of other security or operational features, such as NLP functionality, file-access controls, and document-linking outside of the distribute ledger, as described above.

At block 704, the processor 203 may update the knowledge graph 510 based on the validated knowledge data. The knowledge graph 510 may therefore provide analytics-based information associated with at least the individual. This information may be used to determine a variety of things associated with the individual.

For example, at block 705, the processor 203 may determine a fraudulent activity level associated with the individual based on the updated knowledge graph. It should be appreciated that fraudulent, activity level may be based on information in the knowledge graph, some of which were detailed above. For instance, based on semantic linkage or other associations, certain individuals may be identified as potential threats or be suspicious of fraudulent activity. The fraudulent activity level may be determined by the processor 203 to facilitate security and protection of data, as well as provide a more robust approach against money laundering or terrorism financing.

At block 706, the output interface 221 may output or transmit to the fraudulent activity level in a report to a report requestor at a computing device. It should be appreciated that the report may be transmitted in a predetermined format, selected by the requestor, for example, such as in a text format, an image format, a video format, an audio format, a multimedia format, or a combination thereof.

Although applications of knowledge graphs and distributed ledgers described herein are directed mainly to fraud detection, it should be appreciated that that the data security and protection system 100 may also these techniques in semantic searches, supply chain management and operations, intelligent chatbots, advanced drug discovery, dynamic risk analysis, content-based recommendation engines, and other types of knowledge management system that may integrate additional security measures in blockchain or distributed ledgers. The data security and protection system 100 may also use classification algorithms and clustering schemes, together with knowledge graphs and distributed ledgers, to form a more comprehensive and flexible approach to fraud detection or other data security schemes.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing data security and protection, comprising:
  one or more data stores to store and manage data within a network;
  one or more servers to facilitate operations using information from the one or more data stores;
  an analytics system that communicates with the one or more servers and the one or more data stores to provide data and security in the network, the analytics system comprising:
    a data access interface to:
      receive data associated with an individual from a data source, wherein the individual is associated with at least one of a plurality of entities; and
    a processor to:
      convert the data into a knowledge graph data by using a core schema that allows for user extensions of an ontology wherein the core schema provides an arrangement of the ontology that defines initial data types and relationships included in the knowledge graph, wherein the conversion of the data into the knowledge graph includes:
   performing an entity extraction on the data to identify one or more entities,
   performing a relation extraction on the data to identify one or more relations between the one or more entities, and
   translating the data into knowledge graph triples based on the one or more entities and the one or more relations to generate the knowledge graph data, wherein the knowledge graph data comprises an update to a knowledge graph;
validate the knowledge graph data by:
   using a cryptographic validation on the knowledge graph data to provide data security and protection for contents of the knowledge graph, wherein the cryptographic validation includes providing permissioned access to the knowledge graph at different levels that include read and write access level and only read access level;
update the knowledge graph based on the validated knowledge graph data, wherein the knowledge graph provides analytics-based information associated with at least the individual and the update to the knowledge graph is made by a user at the read and write access level and the update to the knowledge graph includes one of the extensions of the ontology allowed by the core schema associated with the knowledge graph, wherein the extension to the ontology includes sub-typing a new entity underneath an entity of one of the initial data types; and
determine a fraudulent activity level associated with the individual based on the updated knowledge graph; and
an output interface configured to transmit a report associated with the fraudulent activity level to a report requestor at a computing device, wherein the report is transmitted in a predetermined format.

2. The system of claim 1, wherein the data is unstructured data comprising at least one of private information and public information, wherein the private information comprises at least one of financial information, account information, and personal information.

3. The system of claim 1, wherein the data comprises at least one of a text format, an image format, an audio format, and a multimedia format, wherein the data is converted to a text format if it is received in a non-text format.

4. The system of claim 1, wherein the data source comprises at least one of an enterprise resource planning (ERP) system, a document, a web feed, a sensor, a geolocation data source, an enterprise database, a public database, a server, an analytics tool, a mobile device, a reporting system, and a user input.

5. The system of claim 1, wherein converting the data into knowledge graph data comprises natural language processing (NLP).

6. The system of claim 1, wherein one or more of the entity extraction and the relation extraction is performed using a recurrent neural network.

7. The system of claim 1, wherein the knowledge graph is a global knowledge graph having a plurality of decentralized contributors.

8. The system of claim 1, wherein the update to the knowledge graph comprises at least one of an addition, a subtraction, and a modification to the one or more entities or one or more relations.

9. The system of claim 1, wherein the cryptographic validation comprises storing a digital signature on a distributed ledger to provide immutability of the knowledge graph data to update the knowledge graph.

10. The system of claim 9, wherein the cryptographic validation further comprises at least one of NLP functionality, file-access controls, and document-linking outside of the distribute ledger.

11. A system for providing data security and protection in fraud detection, comprising:
   a data access interface to:
      receive data associated with an individual from a data source, wherein the individual is associated with at least one of a plurality of entities;
   a processor to:
      convert the data into knowledge graph data using natural language processing (NLP) by using a core schema that allows for user extensions of an ontology and the core schema provides an arrangement of the ontology that defines initial data types and relationships included in the knowledge graph, wherein the conversion of the data into the knowledge graph includes:
         extracting entities from the data associated with the individual,
         extracting relations from the data associated with the individual, and
         translating the data into knowledge graph triples based on the entities and the relations to generate the knowledge graph data, wherein the knowledge graph data comprises an update to a global knowledge graph, wherein the update to the global knowledge graph comprises at least one of an addition, a subtraction, or a modification to the entities or relations;
      validate the knowledge graph data by:
         using a cryptographic validation on the knowledge graph data to provide data security and protection for contents of the global knowledge graph, wherein the cryptographic validation includes providing permissioned access to the knowledge graph at different levels that include read and write access level and only read access level and the cryptographic validation comprises:
            storing a digital signature on a distributed ledger to provide immutability of the knowledge graph data;
      update the global knowledge graph based on the validated knowledge graph data, wherein the global knowledge graph provides analytics-based information associated with at least the individual and the update to the knowledge graph is made by a user at the read and write access level and the update to the knowledge graph includes one of the extensions of the ontology allowed by the core schema associated with the knowledge graph, wherein the extension to the ontology includes sub-typing a new entity underneath an entity of an one of the initial data types; and determine a fraudulent activity level associated with the individual based on the updated global knowledge graph; and an output interface to transmit to a report associated with the fraudulent activity level to a report requestor at a computing device, wherein the report is transmitted in a predetermined format.

12. The system of claim 11, wherein the data is unstructured data comprising at least one of private information and public information, wherein the private information comprises at least one of financial information, account information, and personal information.

13. The system of claim 11, wherein the data comprises at least one of a text format, an image format, an audio format, and a multimedia format, wherein the data is converted to a text format if it is received in a non-text format.

14. The system of claim 11, wherein the data source comprises at least one of an enterprise resource planning (ERP) system, a document, a web feed, a sensor, a geolocation data source, an enterprise database, a public database, a server, an analytics tool, a mobile device, a reporting system, and a user input.

15. The system of claim 11, wherein the cryptographic validation further comprises at least one of NLP functionality, file-access controls, and document-linking outside of the distribute ledger.

16. The system of claim 11, wherein the predetermined format of the report comprises at least one of a string of text, an image, and an audio.

17. A method for providing data security and protection in fraud detection, comprising:
receiving, at a data access interface, data associated with an individual from a data source, wherein the individual is associated with at least one of a plurality of entities;
converting, at a processor, the data into knowledge graph data using natural language processing (NLP) by using a core schema that allows for user extensions of an ontology and the core schema provides an arrangement of the ontology that defines initial data types and relationships included in the knowledge graph, wherein the conversion of the data into the knowledge graph includes:
  extracting entities from the data associated with the individual,
  extracting relations from the data associated with the individual, and
  translating the data into knowledge graph triples based on the entities and the relations to generate the knowledge graph data, wherein the knowledge graph data comprises an update to a global knowledge graph, wherein the update to the global knowledge graph comprises at least one of an addition, or modification to the entities or relations by a user extending the ontology associated with the knowledge graph to include sub-typing of a new entity underneath an entity of one of the initial data types;
validating the knowledge graph data by:
  using a cryptographic validation on the knowledge graph data to provide data security and protection for contents of the global knowledge graph, wherein the cryptographic validation includes providing permissioned access to the knowledge graph at different levels that include read and write access level and only read access level and the cryptographic validation comprises:
    storing a digital signature stored on a distributed ledger to provide immutability of the knowledge graph data;
updating the global knowledge graph based on the validated knowledge graph data wherein the update includes one of the core-schema allowed extensions of the ontology by the user with the read and write access level, wherein the global knowledge graph provides analytics-based information associated with at least the individual;
determining a fraudulent activity level associated with the individual based on the updated global knowledge graph; and
outputting, at an output interface, to a report associated with the fraudulent activity level to a report requestor at a computing device, wherein the report is transmitted in a predetermined format.

18. The method of claim 17, wherein the data is unstructured data comprising at least one of private information and public information, wherein the private information comprises at least one of financial information, account information, and personal information.

19. The method of claim 17, wherein the data comprises at least one of a text format, an image format, an audio format, and a multimedia format, wherein the data is converted to a text format if it is received in a non-text format.

20. The method of claim 17, wherein the cryptographic validation further comprises at least one of NLP functionality, file-access controls, and document-linking outside of the distribute ledger.

21. A non-transitory computer-readable storage medium having an executable stored thereon, which when executed instructs a processor to perform the method of claim 17.

22. The method of claim 17, wherein distributed ledger contains a transparent and accountable record of insertions and deletions into the knowledge graph.

* * * * *